United States Patent Office 3,595,622
Patented July 27, 1971

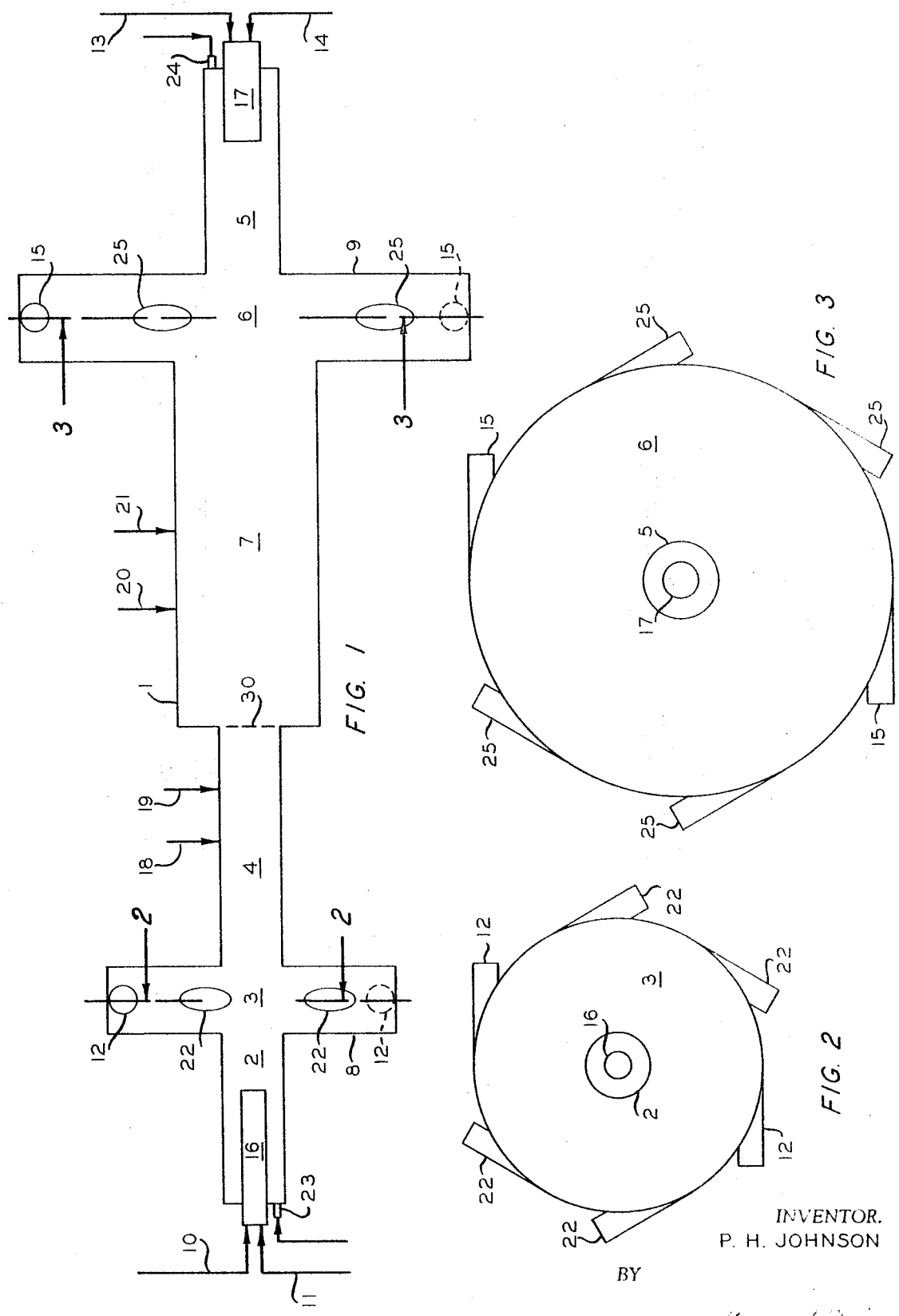

3,595,622
CARBON BLACK REACTOR
Paul H. Johnson, Bartlesville, Okla., assignor to
Phillips Petroleum Company
Filed May 12, 1969, Ser. No. 823,619
Int. Cl. C09c *1/50;* C01b *31/02*
U.S. Cl. 23—259.5                                    3 Claims

ABSTRACT OF THE DISCLOSURE

A unitary carbon black reactor constructed of two carbon black reactors connectively positioned in opposed discharge, each being adapted proximate its feed introduction end for the introduction of carbon black-producing reactants or, alternately, for the removal of carbon black produced in the opposed reactor.

---

This invention relates to carbon black.

In one of its more specific aspects, this invention relates to apparatus for producing carbon black.

In carbon black manufacture, it is conventional to produce a variety of blacks in a single furnace. In general, the various blacks are produced to the quality desired or in the quantities desired by varying the amounts of certain of the reactants employed or by varying the points at which the reactants are introduced into the furnace.

Most carbon black furnaces comprise a series of reaction zones in axial, contiguous alignment. The extent to which the reactants are mixed is related to the properties of the black produced, and mere passage through the reactor influences the extent to which the reactants are intermixed, particularly when the zones are nonuniform in diameter. Accordingly, carbon black quality can vary considerably with the quantity produced. Problems of quality resulting from quantity through-put are most frequently encountered when using reactors having a series of zones of dissimilar diameter.

There has now been developed a single reactor which can be employed to produce a wide variety of blacks. The apparatus of this invention provides such a reactor. According to this invention, there is provided a carbon black reactor comprising a series of contiguous reaction zones in axial alignment, the reactor being adapted for reactant introduction at either of its two ends and for carbon black recovery proximate either end and opposite that into which the reactants are introduced.

Accordingly, it is an object of this invention to provide a reactor in which a wide variety of carbon blacks can be produced.

It is another object of this invention to provide a reactor which is operable over a wide range of production rates to produce a substantially constant quality product.

These and other objects of this invention will become more evident from the following disclosure in conjunction with the attached drawing in which:

FIG. 1 is an elevational view of one embodiment of this invention;

FIG. 2 is a sectional view through section 2—2 of FIG. 1; and

FIG. 3 is a sectional view through section 3—3 of FIG. 1.

Referring now to the attached drawing, there will be seen, in outline in FIG. 1, the internal reaction zones of reactor 1 which, as usual, are insulated and encompassed in an outer shell, not shown. Reactor 1 consists of zones 2, 3, 4, 5, 6 and 7. In actuality, reactor 1 is made up of two reactors, 8 and 9, positioned for opposed discharge. Reactor 8 is comprised of feed or reactant introduction zone 2, combustion zone 3 and reaction zone 4. Reactor 9 is composed of feed or reactant introduction zone 5, combustion zone 6, and reaction zone 7. Imaginary line 30 located between zones 4 and 7 serves as an arbitrary line of demarcation between the two reactors. This single reactor comprises two reactors of any type, similar or dissimilar, known in the art, in opposed discharge. For purposes of simplification, the reactors indicated in FIG. 1 are both of the combustion type, but this is not intended to limit the invention to the employment of similar reactors of any one type.

As illustrated, reactors 8 and 9 differ principally in their relative sizes. Reactor 8 is adapted for introduction of reactants such as feed oil and an oxidant through conduits 10 and 11, which discharge into nozzle 16, and combustion ports 12, which discharge products from the combustion of a fuel with an oxidant into combustion zone 3. Reaction zone 4 is equipped with quench introductory conduits 18 and 19.

Similarly, reactor 9 is adapted for introduction of reactants such as feed oil and an oxidant through conduits 13 and 14, which discharge into nozzle 17, and combustion ports 15 which discharge products of the combustion of a fuel with an oxidant into combustion zone 6. Reaction zone 7 is equipped with quench introductory conduits, such as 20 and 21. Accordingly, while FIG. 1 is not drawn to scale, it will be seen that the principal difference between the two reactors is that of size. In essence, each reactor is complete in itself as to all conventional features, except that each employs a portion of the other reactor for the removal of the carbon black from the reactor.

In the operation of reactors 8 and 9, quench conduits 18, 19, 20 and 21 can be used to quench the smoke. From both reactors, the smoke leaves through combustion ports or through outlet ports, communicating with the combustion zone of the opposed reactor in a direction substantially perpendicular to the axial introduction of feed into the feed introduction zones 2 and 5.

When operating reactor 9, the quenched smoke leaves the reactor through combustion ports 12 or through outlet ports 22, or through a combination of ports 12 and 22. When operating reactor 8, the quenched smoke leaves the reactor through combustion ports 15, or through outlet ports 25, or through a combination of ports 15 and 25. Inasmuch as one of the reactors can be of greater capacity than the other, it is desirable that the combustion zone of the smaller reactor be provided with a greater smoke and exit area than that provided in the combustion zone of the larger reactor.

It will be appreciated that either axial removal or peripheral removal of the carbon black from the reactor can be made. Axial removal involes removal of the black from the reactor through an opening substantially parallel to the path of the black through the reactor. Peripheral removal involves removal of the black from the reactor through the periphery of the axial path through the reactor, for example, through nozzle 25 or nozzles comparably positioned.

Referring now to FIGS. 2 and 3, it will be seen that exit ports 22 and 25 are located to discharge from nozzles in open communication with combustion zone 3 and 6, respectively. Actually, radial or tangential positioning of these nozzles with respect to the combustion zone is equally suitable, the only requirement being that a sufficient number of nozzles be provided to provide adequate exit area for the smoke from the reactor.

It is preferable that the reactor be equipped with a sufficient number of nozzles 22 or 25, such that nozzles 12 and 15 are not employed as smoke exits. In this way, the manifolding of nozzles for reactant introduction and of nozzles for smoke exit can be maintained without requiring dismantling when altering operations to change from the firing of the one reactor to the firing of the other.

The passage of the smoke from the one reactor into the other will tend to result in the deposition of some carbon black in zones 2 and 5, there being little flow in these zones. However, deposition can be minimized by insertion of a refractory plug of the internal configuration and diameter of the zone concerned, or by introducing into the zone, through a nozzle such as 23 and 24, a stream of inert gas to prevent such deposition as shown in FIG. 1. As a matter of convenience, nozzle 16 can be removed with conduits 10 and 11 from zone 2, and nozzle 17 with conduits 13 and 14 can be removed from zone 5 to facilitate the installation of the plugs in the respective zones.

The reactor of this invention is a combination of axial tunnel reactors, of combustion-type reactors, or of any other types known in the art.

It will be seen from the foregoing description that suitable modifications and alterations can be incorporated in the apparatus described herein. However, such is considered as being within the scope of the invention.

I claim:

1. A carbon black reactor comprising two reactor sections in axial contiguous alignment, each of said sections having a reactant inlet end and a carbon black discharge end, the discharge ends of each of said sections being adapted to discharge into the discharge end of the other of said sections, each of said sections being adapted proximate its reactant inlet end with conduit means for recovery of carbon black produced in the other of said sections, said sections being of different internal diameters and individually operable to produce carbon blacks of different quality.

2. The reactor as defined in claim 1 in which each of said sections comprises a feed introduction zone, a combustion zone, and a reaction zone, each of said combustion zones being adapted with conduit means for introduction of reactants and with conduit for removal of carbon black.

3. The reactor as defined in claim 1 in which each of said sections comprises a feed introduction zone, a combustion zone and a reaction zone, each of said feed introduction zones being adapted for introduction of reactants and for removal of carbon black.

References Cited

UNITED STATES PATENTS

| | | | |
|---|---|---|---|
| 2,071,721 | 2/1937 | Bagley et al. | 23—277X |
| 2,814,551 | 11/1957 | Broeze et al. | 23—1 |
| 3,046,095 | 7/1962 | Williams | 23—209.4 |
| 3,235,334 | 2/1966 | Helmers | 23—209.4 |
| 3,472,907 | 10/1969 | Coberly | 23—277X |

JAMES H. TAYMAN, JR., Primary Examiner

U.S. Cl. X.R.

23—277, 284, 209.4